United States Patent [19]

Wakamiya

[11] 4,258,641
[45] Mar. 31, 1981

[54] MARINE FENDER

[75] Inventor: Masatoshi Wakamiya, Yokohama, Japan

[73] Assignee: Bridgestone Tire Company Limited, Tokyo, Japan

[21] Appl. No.: 957,499

[22] Filed: Nov. 3, 1978

[30] Foreign Application Priority Data

Nov. 17, 1977 [JP] Japan .................. 52-137231

[51] Int. Cl.³ .................. B63B 59/02; E02B 3/22
[52] U.S. Cl. .................. 114/219; 267/140; 293/136; 405/215
[58] Field of Search .................. 114/219; 293/136; 405/212, 215; 267/153, 140

[56] References Cited

U.S. PATENT DOCUMENTS

| 3,134,585 | 5/1964 | Trask | 293/136 X |
| 3,507,123 | 4/1970 | Miura | 114/219 |
| 3,600,896 | 8/1971 | Tateisi et al. | 114/219 X |
| 3,690,280 | 9/1972 | Narabu et al. | 114/219 |
| 3,708,988 | 1/1973 | Miura | 405/215 |
| 3,999,497 | 12/1976 | Hamel | 114/219 |

FOREIGN PATENT DOCUMENTS 886295  1/1962  United Kingdom .................. 267/63

Primary Examiner—Charles E. Frankfort
Attorney, Agent, or Firm—Sughrue, Rothwell, Mion, Zinn and Macpeak

[57] ABSTRACT

A marine fender comprising a hollow cylindrical body formed of a resilient rubber block and an annular groove circumferentially extending along at least one end of the cylindrical inner wall of the hollow cylindrical body.

4 Claims, 6 Drawing Figures

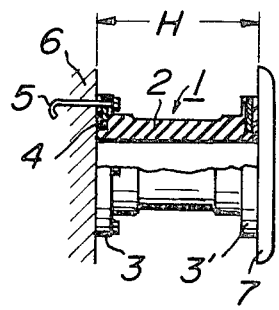
FIG_1 PRIOR ART
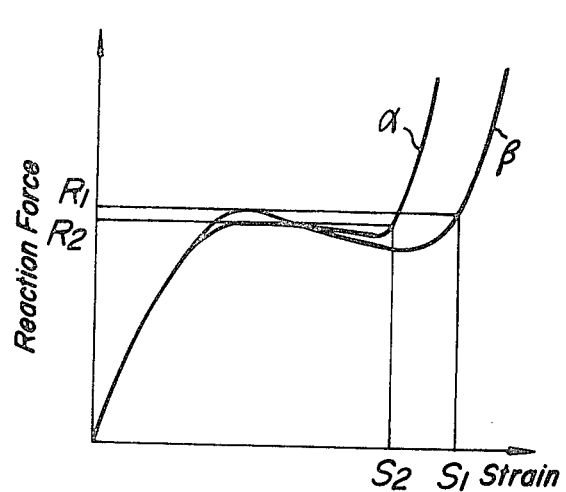
FIG_2
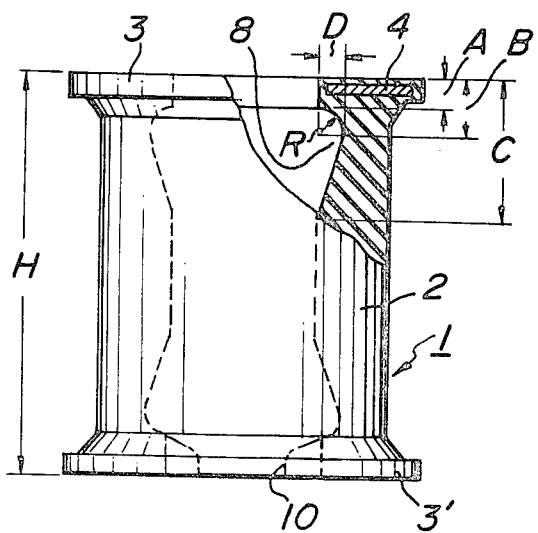
FIG_3

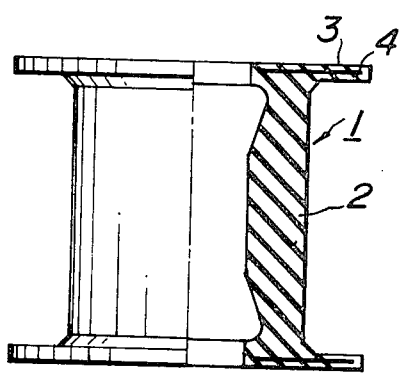
FIG._4a
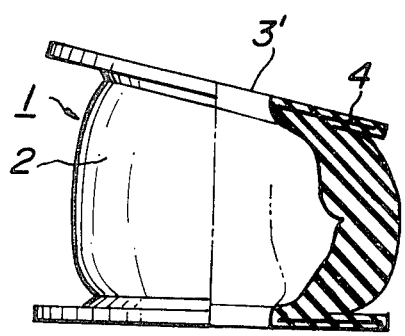
FIG._4b
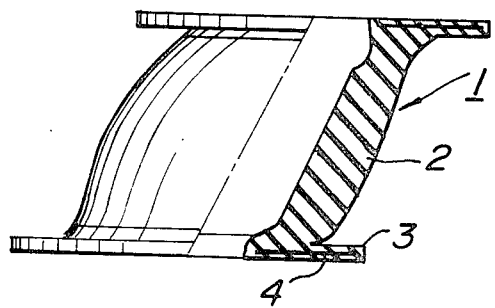
FIG._4c

4,258,641

MARINE FENDER

BACKGROUND OF THE INVENTION

1. Field of the Invention

This invention relates to marine fenders and more particularly to a hollow cylindrical marine fender composed of a resilient rubber block and operative to increase absorption energy and including reinforced fixture plates.

2. Description of the Prior Art

Heretofore it has been proposed to provide a hollow cylindrical marine fender composed of a resilient rubber block and provided at its both ends with a flange-shaped fixture plate including a reinforcing element such as an iron plate or the like embedded therein. Such a marine fender has been fitted to a quay or dock wall for the purpose of absorbing the dynamic energy of a ship being moored in a port so that it can be safely moored without damaging the hull or the quay wall structure. In recent years ships have become increasingly larger. With tremendous kinetic energy present in such giant vessels during mooring, more effective cushioning device to protect the hull and the mooring dock structure is now required.

SUMMARY OF THE INVENTION

An object of the invention, therefore, is to provide a marine fender which can significantly increase absorbing energy and has an excellent durability.

A feature of the invention is the provision of in a marine fender comprising a hollow cylindrical body formed of a resilient rubber block and having one end fitted to a quay wall or the like. The other end is provided with a shock receiving plate or closed by a resilient rubber block to provide a berthing face. Specifically, the invention includes an annular groove circumferentially extending along at least one end of the cylindrical inner wall of said hollow cylindrical body.

BRIEF DESCRIPTION OF THE DRAWING

FIG. 1 is a front elevational view of a conventional marine fender fitted to a quay wall, partly shown in section;

FIG. 2 is a graph of a reaction force versus strain characteristic of a marine fender according to the invention as compared with that of the conventional marine fender shown in FIG. 1;

FIG. 3 is a front elevational view of a marine fender according to the invention, partly shown in section; and FIGS. 4a, 4b and 4c are diagrammatic cross-sectional views illustrating deformation modes of the marine fender according to the invention shown in FIG. 3.

DETAILED DESCRIPTION OF THE PREFERRED EMBODIMENT

FIG. 1 shows a general shape of the above mentioned kind of conventional marine fender. In FIG. 1, reference numeral 1 designates a marine fender; 2 a hollow cylindrical body composed of a resilient rubber block; and 3, 3' flange-shaped fixture plates made integral with each end of the hollow cylindrical body and including a reinforcing member 4 formed of iron plate or the like and embedded therein. Reference numeral 5 designates an anchor bolt having one end fitted to a quay wall 6, the other end extending through the fixture plate 3 and operative to secure one end of the marine fender to the quay wall 6. Reference numeral 7 designates a shock receiving plate secured to the fixture plate 3' and adapted to receive shocks arising during the berthing of a ship.

FIG. 2 shows by a curve α a reaction force versus strain characteristic of the marine fender shown in FIG. 1. As shown in FIG. 2 by the curve α, if the marine fender is subjected to the maximum load, the reaction force arrives at $R_2$ and then is slightly decreased and again arrives at $R_2$ at strain value $S_2$ which is about 47% of a height H of the marine fender 1.

The conventional marine fender tested as above described had the following size and characteristics.

| 900mm(outer diameter) × 600mm(inner diameter) × 1,000mm(height) | |
|---|---|
| Rubber hardness | 70° (Shore hardness) |
| Maximum load $R_2$ | 44 ton |
| Absorbing energy | 17.4 ton-m |

FIG. 3 shows one embodiment of a marine fender according to the invention. In FIG. 3, reference numerals 1 to 4 designate parts which are the same as those shown in FIG. 1. In the case of using the marine fender shown in FIG. 3, one end 3 is fitted to a quay wall and to the other end 3' is fitted the shock receiving plate 7 shown in FIG. 1. The fixture member 3' may be omitted from the other end and the open end of the hollow cylindrical body may be closed by means of a resilient rubber block or the like so as to constitute the berthing face.

The important constructional feature of the marine fender shown in FIG. 3 is the provision of an annular groove 8 circumferentially extending along at least one end of the cylindrical inner wall of the hollow cylindrical body 2.

A reaction force versus strain characteristic of the marine fender shown in FIG. 3 is shown by a curve β in FIG. 2. As shown in FIG. 2 by the curve β, if the marine fender is subjected to a load and is bent, the reaction force once arrives at its maximum value $R_1$ and then is gradually decreased. If the strain of the marine fender arrives at a value $S_1$, the reaction force becomes exceeds the maximum reaction force $R_1$ again. The strain value $S_1$ is about 57% of the height H of the marine fender 1. As can be seen from comparison between the reaction force versus strain characteristic of the conventional marine fender and that of the marine fender according to the invention, the invention is capable of significantly increasing the absorbing energy of the marine fender.

The marine fender according to the invention and tested as above described had the following size and characteristics.

| 900mm(outer diameter) × 600mm(inner diameter) × 1,000mm(height) | |
|---|---|
| Rubber hardness | 70° (Shore hardness) |
| Maximum load $R_1$ | 46 ton |
| Absorbing energy | 22.1 ton-m |

This absorbing energy value was obtained when the annular groove 8 had the following sizes.

A = 50 mm,
B = 100 mm,
C = 350 mm and
D = 50 mm where; A is a distance from one side of the annular groove 8 to the end surface of the flange-shaped fixture plate 3, B is a distance from a center of the annular groove 8 to the end surface of the flange-shaped fixture plate 3; C is a distance from that side of the annular groove 8 which adjoins through a tapered inner periphery to the center cylindrical inner wall of the hollow cylindrical body to the end surface of the flange-shaped fixture plate 3 and; D is a depth of the annular groove 8.

As can be seen from the above, the provision of the annular groove 8 in the conventional marine fender ensures an increase of the absorbing energy by 27% and provides the important advantage that the amount of rubber can be decreased in dependence with the depth of the annular groove 8 such that it is possible to make the marine fender slightly light in weight and convenient in transportation, and that a large marine fender can easily be fitted to a quay or dock wall on dangerous sea.

Experimental tests on the above mentioned annular groove 8 have demonstrated that the above mentioned effect is obtained when the position, size and shape of the annular groove 8 satisfy the following conditions.

(1) The position and size of the annular groove are defined by;

0.08H>A>0.04H
0.2H>B>0.1H
0.4H>C>0.2H and
0.10H>D>0.02H.

(2)The shape of the annular groove is defined as follows.

It is preferable that the annular groove has a depth D and is semi-circular or circular arc in section, the peripheral length of the circular arc being smaller than that of the semi-circle, and that particularly the annular groove has a depth D and is substantially quarter-circular in section. The annular groove is adjoined through a tapered inner periphery to the center cylindrical inner wall of the hollow cylindrical body such that the depth of the annular groove is gradually decreased as shown in FIG. 3.

FIG. 4a shows the marine fender according to the invention under no load condition, FIG. 4b shows the deformed state of the same marine fender taken when it is subjected to an inclined compressive load, and FIG. 4c shows the deformed state of the same marine fender taken when it is subjected to a shearing load.

Experimental tests have demonstrated the following result. If the marine fender according to the invention shown in FIG. 4a is subjected to the inclined compressive load, the hollow cylindrical body 2 becomes bent outwardly into a drum-shaped one as shown in FIG. 4b and hence there is no risk of the repulsive force against the load being reduced and there is no risk of the excessively large stress inducing a break failure of the fixture plate being produced near the fixture plate.

If the marine fender according to the invention shown in FIG. 4a is subjected to the shearing load, the hollow cylindrical body 2 is inclined at an angle to the quay wall as shown in FIG. 4c and hence there is no risk of any large stress being concentrated into the fixture plate 3 fitted to the quay wall and there is no risk of the marine fender being broken. In addition, there is no risk of crack being produced and no risk of the reinforcing iron plate 4 being separated from the fixture plate 3.

What is claimed is:

1. In a marine fender comprising a hollow cylindrical body formed of a resilient rubber block and having one end fitted to a quay wall or the like, the other end being provided with means to provide a berthing face, the improvement comprising an annular groove circumferentially extending along at least one end of the cylindrical inner wall of said hollow cylindrical body, said hollow cylindrical body having a flat outer wall, and said annular groove being quarter circular in section and including a tapered portion extending from the inner side of said quarter circle to a center cylindrical inner wall of said hollow cylindrical body.

2. The marine fender according to claim 1, wherein the position and size of said annular groove are defined by the following conditions, i.e.

0.08H>A>0.04H
0.2H>B>0.1H
0.4H>C>0.2H and
0.10H>D>0.02H where H is a height of the marine fender, A is a distance from one side of the annular groove to the end surface of the fixture plate, B is a distance from the center of the annular groove to the end surface of the fixture plate, C is a distance from that side of the annular groove which adjoins through a tapered inner periphery to the center cylindrical inner wall of the hollow cylindrical body to the end surface of the fixture plate and D is a depth of the annular groove.

3. The marine fender of claim 1, wherein said means to provide a berthing face comprises a shock receiving plate on said other end of said hollow cylindrical body.

4. The marine fender of claim 1, wherein said means to provide a berthing face comprises a resilient rubber block closing said other end of said hollow cylindrical body.

* * * * *